United States Patent [19]

Lynes et al.

[11] 3,753,248

[45] Aug. 14, 1973

[54] TWO-TERMINAL NONDESTRUCTIVE READ JFET-NPN TRANSISTOR SEMICONDUCTOR MEMORY

[75] Inventors: Dennis Joseph Lynes, Madison, N.J.; Peter Theodore Panousis, Salisbury Twp., Lehigh County, Pa.

[73] Assignee: Bell Telephone Laboratories Incorporatad, Murray Hill, Berkeley Heights, N.J.

[22] Filed: June 9, 1972

[21] Appl. No.: 261,417

[52] U.S. Cl. .......... 340/173 R, 307/238

[51] Int. Cl. .......... G11c 11/40

[58] Field of Search .......... 340/173 R, 173 FF, 340/173 C; 307/238, 279

[56] References Cited

UNITED STATES PATENTS 3,354,440 11/1967 Farber .......... 340/173

3,450,967 6/1969 Tolutis .......... 340/173

*Primary Examiner*—Terrell W. Fears
*Attorney*—W. L. Keefauver

[57] ABSTRACT

A semiconductor memory array contains memory cells, each having only two terminals and each comprising a P-channel, a JFET and an NPN transistor. The gate and drain of the JFET are respectively coupled to the collector and base of the NPN transistor. Bit information is written into the cell by causing or inhibiting conduction in the NPN transistor in order to set the potential of the gate of the JFET to one of two values which represent a "1" and a "0," respectively. A positive polarity voltage pulse applied to the source of the JFET causes nondestructive readout of information previously stored in the cell.

7 Claims, 6 Drawing Figures

2 Sheets-Sheet 2

TWO-TERMINAL NONDESTRUCTIVE READ JFET-NPN TRANSISTOR SEMICONDUCTOR MEMORY

BACKGROUND OF THE INVENTION

This invention relates to semiconductor memory apparatus which utilizes memory cells of relatively simple structure.

In many computer and other systems a need exists for large information capacity semiconductor memories in which information can be temporarily stored and then retrieved within a useful period of time. In furtherance of this need, it is desirable that each individual memory cell of the array require as little semiconductor area for its implementation as possible and contain as few terminals as possible. It is also necessary to consider the semiconductor area required for the peripheral circuitry associated with the memory.

In the publication Electronics of Mar. 1, 1971, an article entitled "Bipolar Memory Cells Strike Back in War with MOS" on page 19, and the copending United States application, Ser. No. 103,169, filed Dec. 31, 1970 by D. J. Lynes and J. Mar, a two-terminal memory cell comprising a single junction transistor is described. The described structure requires a fairly small semiconductor area for its implementation and contains only two terminals, but requires avalanche breakdown of one of the junctions of the transistor. In addition, the readout signal from the cell is a transient response that destroys the information stored in the cell.

The copending United States application, Ser. No. 206,272, filed Dec. 9, 1971 by D. J. Lynes describes a semiconductor memory array comprising a plurality of interconnected two-terminal memory cells, each comprising an NPN and PNP transistor. While this memory cell has many desirable electrical characteristics and does not utilize avalanche breakdown, it still produces a transient output signal that destroys information stored in the cell. Because of the transient output signal, fairly sophisticated detection circuits, which require considerable semiconductor area, are utilized to form a workable memory system.

A memory cell of relatively small size which does not utilize avalanche breakdown or have destructive transient readout would be very desirable for use in large information capacity semiconductor memories.

OBJECTS OF THE INVENTION

Accordingly, it is a primary object of this invention to provide a semiconductor memory cell which has a relatively simple structure, requires relatively little semiconductor area for its implementation, has nondestructive readout, and does not require avalanche breakdown operation.

It is a further object of this invention to provide a relatively large capacity semiconductor memory using an array of memory cells each of which meets the abovementioned objective.

SUMMARY OF THE INVENTION

These and other objects of the invention are attained in an illustrative embodiment thereof comprising a semiconductor memory array having a plurality of interconnected memory cells, each of which comprises a P-channel junction field effect transistor (JFET) and an NPN junction transistor. In each of these memory cells the gate and drain of the JFET are coupled to the collector and base of the NPN transistor, respectively. The sources of the JFETs serve as first cell terminals and the emitters of the NPN transistors serve as second cell terminals. Control lines connected to the second terminals will be denoted as digit lines and control lines connected to the first terminals will be denoted as word lines.

A "0" is written into a selected cell of the array by forward-biasing the source gate junction of the JFET and holding the emitter at ground potential to allow conduction through both the JFET and the NPN transistor. This conduction causes the potential of the gate of the JFET to be set to a discrete value, which is defined as the "0" level. A "1" is written into the selected cell in the same manner as a "0" except that the potential applied to the emitter of the NPN transistor of the selected cell is such as to prevent conduction within the NPN transistor. The P-N junction of the JFET is forward-biased and the potential of the gate of the JFET is increased to a level which is more positive than the "0" level. This level, which is above the pinch-off voltage of the JFET, is defined as the "1" level.

To read out information stored in the cell, a positive polarity pulse of a lesser amplitude than the write pulse is applied to the source of the JFET. If a "1" is stored in the cell, the JFET does not turn on and consequently there is no flow of current through the NPN transistor. If a "0" is stored in the cell, the JFET and the NPN transistor both turn on and d.c. current flows from the emitter of the NPN transistor. This flow of current is indicative of a stored "0." This d.c. flow of current continues for the full duration of the read pulse. The readout is non-destructive since the potential of the gate remains at the value attained prior to the readout operation.

These and other objects, features and embodiments will be better understood from a consideration of the following detailed description taken in conjunction with the accompanying drawings:

DETAILED DESCRIPTION

Figure 1:
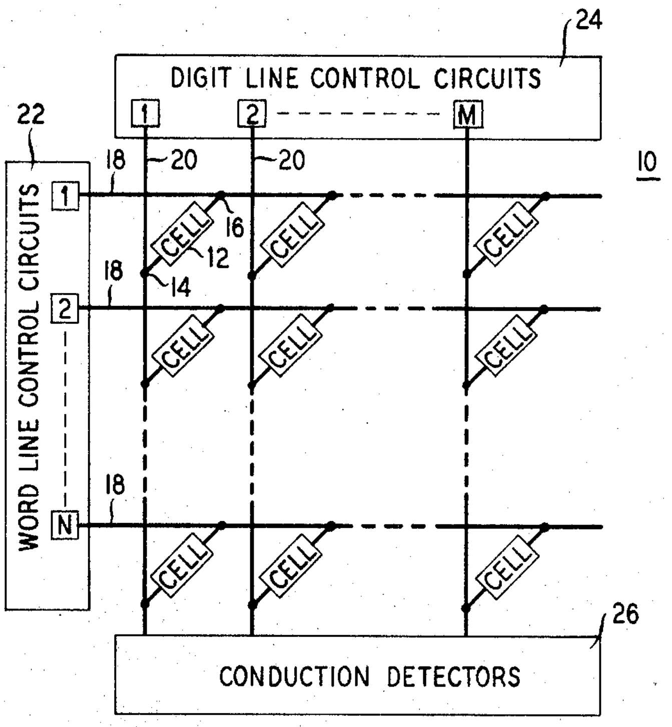
FIG. 1 illustrates in block circuit form a memory system in accordance with the invention.

Referring now to FIG. 1, there is shown the basic elements of a word-organized memory system 10 in accordance with this invention. A plurality of individual memory cells 12 are arranged in a two-dimensional array of M rows and N columns to form a memory having MXN memory cells. Each of the memory cells 12 which has two terminals, 14 and 16, is capable of storing bit information for a useful period of time. Terminal 16 is connected to a word line 18 and terminal 14 is connected to a digit line 20. All of the word lines 18 are connected to word line voltage control circuits 22 and all of the digit lines 20 are connected to digit line voltage control circuits 24 and conduction detectors 26.

Figure 2:
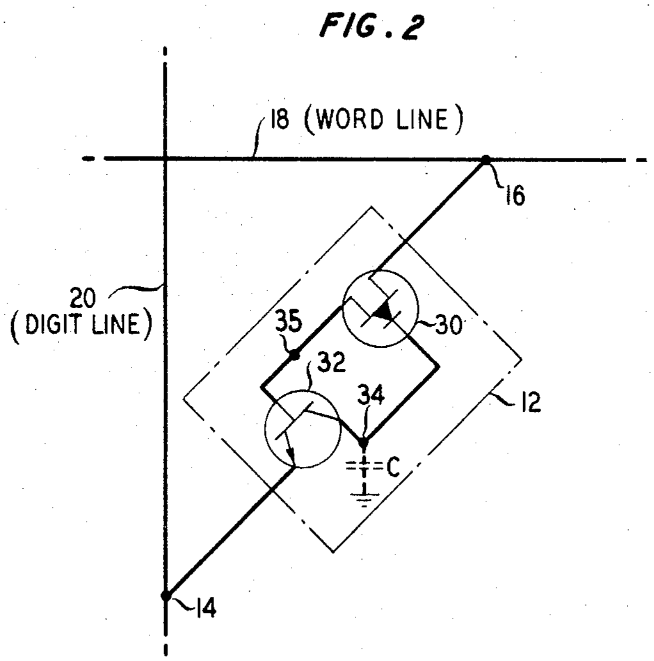
FIG. 2 illustrates a schematic circuit of a memory cell suitable for use in the memory system of FIG. 1.

Referring now to FIG. 2, there is illustrated a circuit schematic of a preferred memory cell suitable for use as the memory cell 12 illustrated in FIG. 1. More specifically, the cell shown inside the broken line rectangle 12 comprises a preferred embodiment of the inner structure of cell 12 of FIG. 1. As illustrated, the cell comprises a P-channel JFET 30 and an NPN junction transistor 32. The gate and drain of the JFET 30 are respectively coupled to the collector and base of NPN transistor 32. The common node of the gate and collector is denoted as 34. The common node of the drain and source is denoted as 35. The emitter of NPN transistor 32 constitutes terminal 14 of the memory cell. The source of JFET 30 constitutes terminal 16 of the memory cell. Capacitance C represents the equivalent parasitic capacitance associated with the gate of JFET 30 and the collector of NPN transistor 32.

Figure 3:
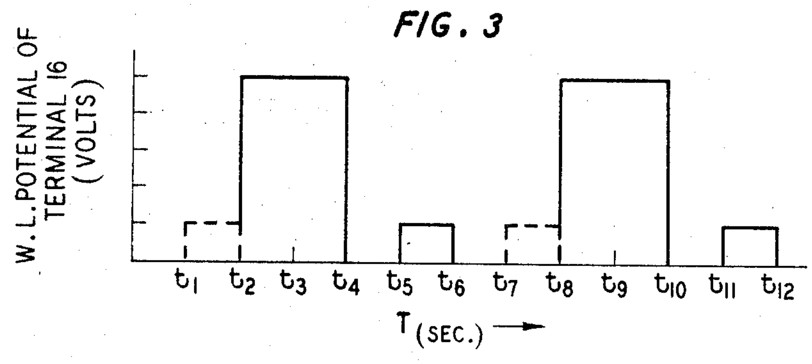
FIGS. 3 and 4 graphically illustrate the potentials applied to the terminals of the memory cell of FIG. 2 as a function of time.
Figure 4:
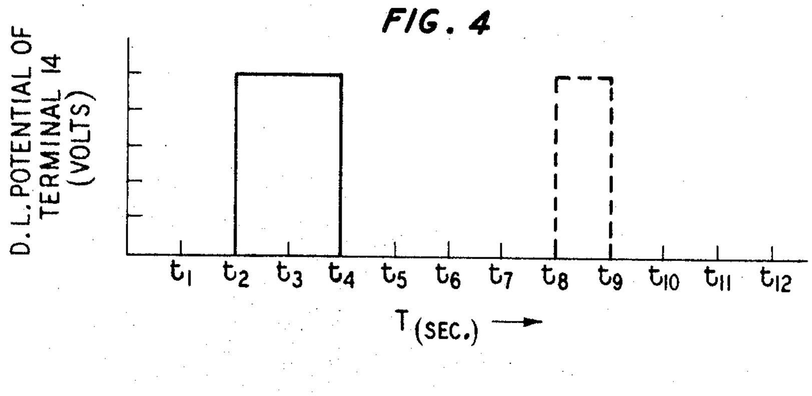
Figure 5:
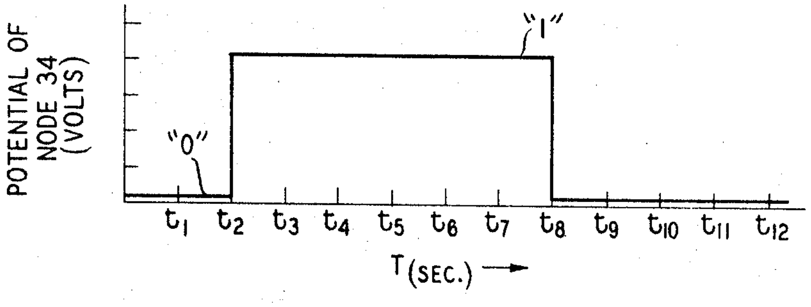
FIGS. 5 and 6 illustrate the corresponding potential of the gate of the JFET as a function of time and conduction through the NPN transistor as a function of time.
Figure 6:
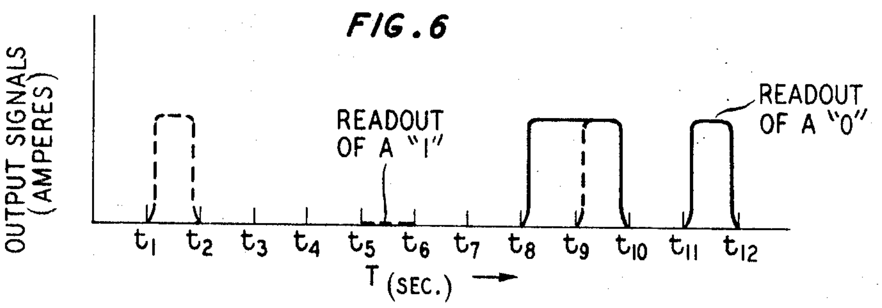

The typical operation of the memory cell of FIG. 2 can be easily seen from the voltage and current graphs of FIGS. 3, 4, 5 and 6. FIGS. 3 and 4 illustrate the potentials applied to terminals 16 and 14 by the word line control circuits 22 through word line 18, and the digit line control circuits 24, through digit line 20, respectively, as a function of time. FIG. 5 illustrates the corresponding potential of the mode 34 as a function of time. FIG. 6 illustrates the current flowing through transistor 30 as a function of time. In order to simplify the discussion of the operation of a single memory cell, the dashed-line waveforms of FIGS. 3, 4 and 6 will be ignored for the present. They will be discussed later in connection with the memory array of FIG. 1.

As illustrated in FIGS. 3 and 4 at $T=t_{2-}$ the terminals 14 and 16 are held at a reference potential which is typically ground potential. FIG. 5 illustrates that the potential of node 34 is assumed to be at a potential close to the reference potential which is defined at a "0" level. Typically the "0" potential is 0.2 volt. FIG. 6 illustrates that there is no conduction in transistor 30 at $T=t_{2-}$.

In order to write a "1" into cell 12, a positive polarity voltage pulse, the amplitude of which is greater than the pinchoff voltage of JFET 30, is applied to node 16 by the word line control circuits 22 through word line 18 between $T=t_2$ and $t_4$. At the same time a positive polarity voltage pulse of approximately the same amplitude as that applied to node 16 is applied to terminal 14 by digit line control circuits 24 through digit line 20. The voltage pulse applied to terminal 16 causes the source gate junction of JFET 30 to be forward-biased and consequently for node 34 to be charged to a value close to that of the amplitude of the applied pulse. This value is defined as a "1." The voltage pulse applied to terminal 14 prevents NPN transistor 32 from conducting. Typically the amplitude of the write pulse applied to terminal 16, is +5 volts and a "1" potential level is 4.6 volts.

At $T=t_4$ the word line voltage and the digit line voltage both return to the reference potential. Capacitance C maintains the potential on node 34 at approximately the potential attained during the period from $T=t_2$ to $t_4$.

At $T=t_5$ a positive polarity read voltage pulse is applied to terminal 16 while terminal 14 is held at the reference potential. The amplitude of this read pulse is less than that of the write pulse. Typically the amplitude of the read pulse is +1 volt. If the cell stores a "1" the source gate potential is above the pinchoff voltage and consequently neither the JFET or the NPN transistor turns on. As is illustrated in FIG. 6, during the time from $T=t_5$ to $t_6$, there is substantially no flow of current through NPN transistor 32. This corresponds to the existence of a "1" stored in memory cell 12. It is to be noted that at $T=t_{6+}$ the potential of node 34 remains at the "1" level. This means that the readout of a "1" has not destroyed the stored "1."

In order to write a "0" into a cell which stores a "1," the same pulse applied to terminal 16 to write a "1" into the cell is again applied, but terminal 14 is now held at the reference potential. This causes the source gate junction of JFET 30 to be forward-biased and the gate potential to be above the pinchoff voltage, thereby causing conduction in JFET 30 and transistor 32. Transistor 32 conducts in a saturation mode and, therefore, the collector (node 34) potential is at just a few tenths of a volt above the reference potential. This means, as is illustrated in FIG. 5 at $T=t_{8+}$, that the potential of node 34 is typically +0.2 of a volt, which is defined as a "0" level. Capacitance C maintains this potential after the write pulse subsides and until another read pulse is applied to the cell.

In order to read out the "0" now stored in the cell, a positive polarity voltage pulse is applied to terminal 16 between $T=t_{11}$ and $t_{12}$. This pulse is substantially the same as the read pulse applied during $T=t_5$ and $t_6$. During the time from $T=t_{11}$ to $t_{12}$, terminal 14 is held at the reference potential. As a consequence of the potentials applied to terminals 14 and 16 and the fact that node 34 is at the "0" level there is steady state d.c. conduction established in transistor 32 in the time period between $T=t_{11}$ and $t_{12}$, as is illustrated in FIG. 6. This conduction is indicative of a "0" stored in the cell. It is to be noted that at $T=t_{12+}$ the potential of node 34 is still at the "0" potential. This means that the readout of a "0," like the readout of a "1," does not destroy the information stored in the cell. Typically the time duration between $T=t_x$ and $T=t_{x+1}$, where $1 \leq X \leq 11$, is 20 nanoseconds.

As has been discussed, the reading out of stored information from a memory cell does not destroy the information stored in the cell. In addition, the readout of a "0" causes d.c. current to flow between the word line and the digit line. The existence of this d.c. readout makes possible the use of relatively simple detection circuits. Consequently, these detection circuits can be fabricated in a relatively small area of silicon, thereby making the total memory system relatively compact.

In a typical embodiment of the invention the memory cell of FIG. 2 may be fabricated in approximately 3 mils square of semiconductor area. Starting with a *p*-type semiconductive substrate, an *n*+-type buried layer is selectively deposited into the substrate. A p-type epitaxial layer is then grown and converted to silicone dioxide except in the area overlying the *n*+-type diffusion. Two separate *n*+-type diffusions are then made into the remaining *p*-type epitaxial layer. A contact made to the *p*-type epitaxial layer serves as the source terminal of the cell and a contact made to one of the two *n*+diffusions in the *p*-type epitaxial layer serves as the emitter terminal. The second *n*+diffusion serves as the collector and gate of the memory cell while the portion of the epitaxial layer between the two *n*+-type diffusions serves as the drain and base. The capacitance associated with the gate and collector is enhanced by the *n*+-type buried layer.

One major advantage of the memory cell of FIG. 2 is that the physical size of the cell can be reduced without any loss in output signal. This is because charge stored in C of FIG. 2 does not become part of the output signal as is true in other dynamic memory cells.

In order to utilize the cell of FIG. 2 in a word organized memory, like the memory of FIG. 1, several minor changes are made in the waveforms of FIGS. 3 and 4. The dashed line voltage pulses of FIG. 3 applied between the times $T = t_1$ and $t_2$ and $T = t_7$ and $t_8$ are similar to the read pulses applied between $T = t_5$ and $t_6$ and $T = t_{11}$ and $t_{12}$. These dashed line pulses, like the read pulses, cause information stored in the cells to be read out and detected. Prior to writing into a selected cell of a particular word line, it is necessary to know what information is stored in all of the cells coupled to that word line, such that during the time information is written into the selected cell, information stored in these cells may be maintained.

Normally the digit line potentials are left at the reference potential except during the time a "1" is written into a particular cell. If it is determined, after the application of the first dashed line read pulse of FIG. 3 that a cell coupled to the same word line as the selected cell contains a "1, " then the digit line control circuits cause a voltage pulse to be applied to the digit line corresponding to that cell during the time ($T = t_2$ to $t_4$) a "1" is written into the selected cell in order to insure that the "1" stored in this other cell is maintained. If this other cell contains a "0, " then the corresponding digit line potential is kept at the reference potential to insure that the stored "0" is maintained.

The dashed line voltage pulse of FIG. 4 which appears between $T = t_8$ and $t_9$ is utilized to insure that proper "1"s are maintained in memory cells coupled to the word line corresponding to the selected cell during the time information is written into the selected cell. If it were not for this pulse and like pulses applied to the other digit lines, there could be an initial relatively large flow of current from the word line circuits which would tend to load down the word line circuits and lower the amplitude of the write voltage pulse, thereby decreasing the potentials of "1"s stored in memory cells coupled to the selected word line.

As is illustrated in FIG. 6, there is substantially no current flow in the selected cell between $T = t_8$ and $t_9$ if the dashed pulse of FIG. 4 is utilized. This is to be contrasted with the d.c. type of current flow illustrated during the same period of time if the dashed pulse of FIG. 4 is not utilized.

It is to be understood that the embodiments described herein are merely illustrative of the general principles of the invention. Various modifications are possible consistent with the spirit of the invention. For example, an N-channel JFET and a PNP transistor may be substituted for the P-channel JFET and the NPN transistor providing the relevant voltages are reversed. Still further, an insulated field effect transistor with a diode coupled between the source and gate could be substituted for the JFET, the anode of the diode being coupled to the source and the cathode being coupled to the gate.

What is claimed is:

1. A semiconductor memory apparatus comprising:

a plurality of interconnected memory cells, each of which comprises two terminals and is adapted to store bit information;

each of the memory cells comprising a JFET and a junction transistor, the gate and drain of the JFET being coupled to the collector and base of the junction transistor, respectively;

the source and emitter of each cell serving as the first and second terminal, respectively;

a capacitor coupled to the common node of the collector and gate of each memory cell;

first write-in means coupled to the cells for causing conduction in the JFET and junction transistor of a selected cell in order to set the potential of the gate collector node of the selected cell set to a first level which is defined as a "0";

second write-in means coupled to the cells for selectively causing the source gate junction of a selected memory cell to be forward-biased while the emitter base junction of the junction transistor of selected cell is reverse-biased in order to set the potential of the corresponding gate collector node to a second level which is defined as a "1" ; and readout means coupled to the cells for first increasing and then decreasing the potential of the source of a selected memory cell to cause bit information stored in the selected cell to be nondestructively read out.

2. The apparatus of claim 1 further comprising detection means coupled to the memory cells for detecting conduction in the junction transistor of each memory cell.

3. The apparatus of claim 2 wherein the JFET is a P-channel-type JFET and the junction transistor is an NPN-type transistor.

4. The apparatus of claim 3 wherein the first and second write-in means are voltage pulse circuits.

5. A method for performing a memory function utilizing at least one memory cell which comprises a JFET, the gate and drain of which are coupled to the collector and base of a junction transistor, respectively, consisting of the steps of:

writing a "1" into the memory cell by forward-biasing the source gate junction of the JFET while inhibiting current flow through the junction transistor in order to set the potential of the gate to a level defined as a "1" level;

writing a "0" into the memory cell by forward biasing the source gate junction of the JFET and causing the JFET and the junction transistor to conduct such that the potential of the gate of the JFET is set to a level defined as a "0" level; and reading out bit information stored within the memory cell by first increasing and then decreasing the potential of the source such that conduction occurs in the JFET and the NPN transistor if the cell stores a "0".

6. The method of claim 5 further comprising the step of:

detecting bit information stored within the cell by monitoring conduction in the junction transistor.

7. Semiconductor memory apparatus comprising:

a plurality of interconnected memory cells; each of the memory cells comprising a first transistor, a second transistor, and a diode;

the diode being coupled to the first transistor;

the first transistor being coupled to the second transistor;

a capacitor coupled to a common node of the first and second transistors;

first write-in means coupled to the cells for causing conduction in both transistors of a selected cell in order to set the potential of the capacitor to a first level which is defined as a "0";

second write-in means coupled to the cells for selectively causing the diode to be forward-biased while the second transistor is biased such that there is no conduction through it in order to set the potential of the capacitor to a second level which is defined as a "1"; and readout means coupled to the cells for first increasing and then decreasing the potential applied to a selected cell to cause bit information stored in the selected cell to be nondestructively read out.

* * * * *